United States Patent
Evans et al.

[15] 3,664,856
[45] May 23, 1972

[54] PAVING ASPHALT COMPOSITIONS

[72] Inventors: Charles C. Evans, Concord; Harry J. Sommer, Lafayette, both of Calif.

[73] Assignee: Shell Oil Company, New York, N.Y.

[22] Filed: July 27, 1970

[21] Appl. No.: 58,690

[52] U.S. Cl.............................106/278, 106/279, 106/280, 94/20, 94/23
[51] Int. Cl...................C08h 13/00, C08h 17/22, C08i 1/46
[58] Field of Search..........................106/273–285; 94/19–22; 208/22, 23, 39

[56] References Cited

UNITED STATES PATENTS

| | | | |
|---|---|---|---|
| 2,720,466 | 10/1955 | Kalinowski et al. | 106/273 X |
| 3,270,631 | 9/1966 | Bower | 106/277 X |
| 2,904,494 | 9/1959 | Griffin | 106/278 |

FOREIGN PATENTS OR APPLICATIONS

| | | | |
|---|---|---|---|
| 608,711 | 11/1960 | Canada | 106/278 |

*Primary Examiner*—Joan B. Evans
*Attorney*—Glen R. Grunewald and John H. Colvin

[57] ABSTRACT

Asphalt compositions suitable for mixing with aggregate at high temperatures are produced by incorporating into an asphalt cement a minor amount, i.e., from 0.01 to 1.5 percent by weight, of a low-boiling hydrocarbon fraction. The resulting asphalt compositions have substantially improved compaction properties and are highly durable.

8 Claims, No Drawings

PAVING ASPHALT COMPOSITIONS

This invention relates to improved paving asphalt compositions. More particularly, it relates to asphalt compositions which when mixed with hot aggregate, produce asphalt mixes which are easily compacted and are highly durable.

Asphalt employed in paving applications must conform to a wide variety of specifications including limits on penetration, viscosity, volatility, ductility, hardening on aging and the like. It is known that two asphalts whose initial properties meet specifications can behave differently after being subjected to mixing with aggregate at high temperatures, e.g., temperatures of 250° F. or higher such as in conventional hot-mix plants. Although meeting all required specification tests, the resulting asphalt-aggregate mix is in many cases difficult to compact using conventional paving techniques and frequently, when compacted, exhibits a tendency to shove under traffic or scuff under the action of power steering. Ease of compaction, while not normally a specification requirement, is extremely important to contractors, since if the mix is too soft, rolling must be postponed until the mix cools down, or alternatively a better, more expensive aggregate must be employed. Neither of these expedients is economically attractive to the contractor and in some cases none of the locally available aggregates correct the deficiency.

It has become increasingly recognized in the art that the compaction properties of an asphalt-aggregate mix are closely related to the post-aging viscosity of asphalt, i.e., viscosity of the asphalt after being subjected to an oven test under conditions simulating the hardening effect of hot mixing. Representative of such tests are the Thin Film Oven Test (ASTM D 1754) and the Rolling Thin Film Oven Test (California Test Procedure 346–C). Asphalts which produce mixes having desirable compaction properties generally exhibit an increase in viscosity upon aging. For example, asphalts which have a post-aging to pre-aging viscosity ratio at 140° F. of 2 to 3 or higher normally produce mixes which are relatively easy to compact, while asphalts having viscosity ratios of 1.5 to 2.0 generally produce mixes which are more difficult to compact, thus, necessitating longer periods of waiting between the spreading and compacting steps.

Although characteristics of asphalt which influence the compactability of the asphalt-aggregate mix are to some extent known, it is not always possible to produce an asphalt having the desired properties because of the variety of crudes from which such products are manufactured, and competing economic factors such as the current emphasis on maximizing distillate recovery. In order to maximize the distillate recovery, severe reduction of the asphalt-containing residue is necessary, for example, by deep vacuum flashing or deep propane deasphalting. Such techniques result in the production of hard asphalt base stocks, which although generally are very durable, would not meet grade specifications for paving asphalt. Thus, there is need in the art for asphalt compositions, which in addition to meeting the many traditional specification requirements for paving grade asphalts, also produce asphalt-aggregate mixes having good compaction properties which are of prime importance to contractors.

It has now been found that paving asphalt compositions suitable for producing asphalt-aggregate mixes having improved compaction properties can be prepared by incorporating into an asphalt cement, a minor amount, e.g., 1.5%w or less, of a low-boiling hydrocarbon fraction having a boiling range of from about 100° F. to about 550° F. The asphalt compositions of the invention are characterized as high flash point asphalts, i.e., compositions having flash points of at least 440° F. and preferably above 500° F., thus enabling them to be employed in applications wherein the asphalt and aggregate are mixed at high temperatures such as in a hot-mix plant.

The term "asphalt cement" as employed in the specification and claims, is defined as any asphalt suitable for use in paving work and other asphalt mix construction. Blending components for asphalt cements include straight-reduced asphalts, asphalts obtained by solvent fractionation such as propane asphalts, thermal asphalts, natural asphalts such as gilsonite, and oils of high molecular weight. Asphalt cements typically have penetration values of from 20 to 300 and can be brought to any desired consistency by mixing or fluxing with harder or softer components as the case may be. Penetration numbers appearing in the specification unless otherwise indicated refer to penetration values at 77° F. determined in accordance with ASTM D 5 under a load of 100 grams for 5 seconds.

Low-boiling hydrocarbon fractions suitable for incorporation into the present compositions are those having the boiling ranges hereinbefore specified and include fractions commonly referred to as kerosene, mineral spirits, naphthas and the like. These fractions can be incorporated into the base asphalt in amounts of from 0.01 to 1.5 percent by weight on the basis of the total composition. Asphalt compositions containing from 0.5 to 1.0 percent by weight kerosene or mineral spirits, or from 0.3 to 0.8 percent naphthas have been found to be particularly advantageous. The low-boiling hydrocarbon fraction may be incorporated into the asphalt cement, in any convenient manner, for example, added directly to the base asphalt, or blended with another asphalt first, and then added to the base asphalt. A very convenient method of addition is to add a measured quantity of a cutback asphalt as hereinafter defined to a base asphalt, thus producing an asphalt cement having the desired concentration of low boiling hydrocarbon material.

The incorporation of the low-boiling hydrocarbon fraction into the base asphalt in the above-specified amounts, while appreciably improving the compaction properties of the aggregate-asphalt mix has been found to have minimum adverse effects on the flash point and other properties of the blend, and in some instances has brought about unexpected improvements. For example, long term durability in the road has been found to remain unaffected or may even be improved with asphalts containing small amounts of low boiling solvents. Measurement of this durability is best simulated by California Test Method 347–A wherein residues from the Rolling Film Oven Test previously described are subjected in thin films to further hardening in air at lower temperatures for a longer period of time to simulate aging in the road. Viscosities of the durability residues are measured by means of the sliding plate microviscometer at 77° F. at two shear rates. The good durability of the present compositions as shown by the examples is particularly surprising in view of U.S. Pat. No. 2,904,494 which teaches that in order to obtain an asphalt product having good durability, it is necessary that all fractions having a molecular weight below 400 be removed.

Another unexpected feature of the present compositions is their stability during prolonged periods of storage in tanks at relatively high temperatures. Apparently because of the small amounts in which the light hydrocarbon fraction is employed, this fraction becomes intimately bound in the base asphalt and is not volatilized therefrom to any large extent when stored at temperatures of about 300° F. or higher as would normally be expected.

In addition, it has been found that the shear susceptibility of the present compositions containing the low-boiling hydrocarbons is actually improved contrary to normal expectations as discussed in Example I.

The asphalt compositions of the invention are to be distinguished from liquid asphalt products, also termed "cutback asphalts", which are essentially solutions of bitumen in various solvents. Because such compositions are in liquid form, they can be applied directly to road surfaces, for example, by spraying, without having to be heated to high temperatures prior to use. Cutback asphalts are employed for a variety of purposes, e.g., surface treating of roads, cold-patching, asphalt paints, etc., and generally are classified in three different types, i.e., rapid curing (RC), medium curing (MC), and slow curing (SC), the rate of curing depending on the type and amount of solvent present. RC cutbacks are normally prepared using naphtha as solvent, while kerosene-type diluents are used in MC cutbacks, and gas oils or other heavier boiling fractions are employed in SC cutbacks. The amount of solvent varies somewhat depending on the grade, but generally ranges from 12 to 50 percent or higher. The specification requirements for flash point, viscosity, distillation range, etc., will also vary depending on the application for which the cutback asphalt is used. For example, MC cutbacks generally have flash points in the range 100° to 150° F. and penetration values well above that measurable by the standard penetration test. In contrast, the asphalt compositions of the invention contain very low concentrations of low-boiling hydrocarbons, have relatively low penetration values and high flash points as hereinbefore discussed.

The present invention will be further described by means of the following examples which are given for illustrative purposes only, therefore, the invention in its broader aspects should not be limited thereto.

EXAMPLE I

A base asphalt containing 2.25%w of MC–1, which in turn contains 32percent kerosene, was blended with a 200/300 penetration vacuum residue as required to approach the extremes of the 85/100 penetration grade. A conventional 85/100 penetration asphalt was blended from similar base stocks produced from West Texas sour and Oklahoma sweet crudes. Compositions and properties are recorded in Table I.

TABLE I

| | Asphalt 1 | Asphalt 2 | Conventional asphalt A |
|---|---|---|---|
| Composition, percent w.: | | | |
| Base asphalt | 80.6 | 73.3 | 69.5 |
| 200/300 penetration asphalt | 17.5 | 25.0 | 30.5 |
| MC–1 (containing 32% kerosene) | 1.9 | 1.7 | |
| Properties: | | | |
| Penetration, dmm | 85 | 97 | 93 |
| Flash, COC, °F | 610 | 620 | 640 |
| Viscosity, 140° F., poise | 1,530 | 1,070 | 969 |
| Thin film oven test (ASTM D 1754): | | | |
| Weight loss, percent w | 0.43 | 0.38 | 0.01 |
| Retained penetration, percent original | 50 | 58 | 67 |
| Viscosity of residue, 140° F., poise | 3,900 | 2,850 | 1,950 |
| Viscosity ratio, residue/original | 2.55 | 2.7 | 2.0 |
| Rolling thin film oven test (RTFOT) California test procedure 346–C: | | | |
| Retained penetration, percent original | 54 | 58 | 62 |
| Viscosity of residue, 140° F., poise | 5,070 | 3,035 | 2,220 |
| Viscosity ratio, residue/original | 3.3 | 2.8 | 2.3 |
| Durability test on residue from RTFOT California test procedure 347–A: | | | |
| Viscosity of residue, 77° F., megapoise: | | | |
| Shear rate, 0.001 sec.$^{-1}$ | 67.5 | 39.5 | 38.0 |
| Shear rate, 0.05 sec.$^{-1}$ | 21.9 | 12.6 | 11.0 |
| Viscosity ratio, durability/RTFOT: | | | |
| Shear rate, 0.001 sec.$^{-1}$ | 13×10³ | 13×10³ | 17×10³ |
| Shear rate, 0.05 sec.$^{-1}$ | 4×10³ | 4×10³ | 5×10³ |
| Shear susceptibility slope, 77° F | 0.29 | 0.29 | 0.32 |

From the data in Table I it is evident that Asphalts 1 and 2, in accordance with the invention, are substantially higher in post-aging viscosity at 140° F. and in viscosity ratio than is the conventional asphalt which is indicative of the superior compaction properties which may be expected from asphalt-aggregate mixes prepared from the compositions of the invention.

The durability test which is run on the residue from the Rolling Thin Film Oven Test is intended to simulate further aging in the pavement during service. In this test a 20 micron film of asphalt is exposed to air for 24 hours in an oven at 210° F. While the viscosity after the durability test is higher for Asphalt 1 and 2 than for Conventional Asphalt A, the ratio of that viscosity to the viscosity after the rolling thin film oven test is lower for Asphalt 1 and 2 than for the Conventional Asphalt. Thus, long term hardening in the pavement can be expected to proceed at a lower rate for asphalts prepared in accordance with the invention.

Shear susceptibility is the effect of shear rate on viscosity and is defined as ($\log_{10}$ vis at 0.001 sec$^{-1}$ − $\log_{10}$ vis at 0.05 sec$^{-1}$) divided by $\log_{10}50$. Excessive shear susceptibility is considered detrimental to a pavement's ability to relieve stresses due to changes in temperature and movements of the subgrade. Although there are no specified limits at the present time, excessive shear susceptibility is known to lead to pavement failure. From Table I, it is apparent that the new method of asphalt manufacture not only gives mixes which are easier to compact but additionally gives a binder with a lower shear susceptibility in service than the current asphalt. This is unexpected since low shear susceptibility is usually associated with low viscosity ratios.

EXAMPLE II

To further demonstrate the improved properties of the present compositions and their stability in storage at 350° F., two tanks containing 400 bbls of 85/100 penetration grade asphalt were blended, one with kerosene and the other without, and samples periodically taken and tested with the results shown in Table II. Blending components were similar to those used for the blends in Table I.

TABLE II

| Properties | Asphalt 3 sample time, months | | | | Conventional Asphalt B sample time, months | | |
|---|---|---|---|---|---|---|---|
| | 0 | 0.5 | 2.5 | 4.5 | 0 | 0.5 | 2.5 |
| Penetration, dmm | 88 | 91 | 88 | 93 | 96 | 91 | 88 |
| Flash, COC, °F | 595 | 565 | 605 | 600 | 595 | 605 | 630 |
| Viscosity, 140° F., poises | 1,030 | 1,070 | 1,150 | 1,100 | 1,000 | 1,250 | 1,150 |
| Thin film oven test: | | | | | | | |
| Retained penetration, percent original | 55.7 | 51.6 | 59 | 57 | 55.2 | 52.7 | 64.8 |
| Viscosity of residue, 140° F., poises | 3,160 | 3,170 | 2,990 | 2,900 | 2,350 | 2,800 | 2,425 |
| Viscosity ratio | 3.1 | 3.0 | 2.6 | 2.6 | 2.3 | 2.2 | 2.1 |

From the foregoing results it is clearly evident that the improved post-aging viscosity and viscosity ratio of the inventive composition were substantially maintained during the period of storage.

EXAMPLE III

To further illustrate the advantages of the present composition, an asphalt cement comprising a hard base asphalt, and 1.3 percent mineral spirits was prepared (Asphalt 4 shown in Table III), and its properties determined and compared to a conventional asphalt cement prepared from similar base stocks, but not in accordance with the invention. The compositions of the respective asphalts and their properties are presented in Table III below. The asphalts described in Table III were derived from West Texas sweet crudes processed by deep vacuum flashing, air-blowing and blending.

TABLE III

| | Asphalt 4 | Conventional asphalt C |
|---|---|---|
| Composition, percent w.: | | |
| Base asphalt, 2,100 poise at 140° F | 98.7 | 80.0 |
| Soft vacuum flasher residue | | 20.0 |
| Mineral spirits | 1.3 | |
| Properties: | | |
| Penetration, dmm | 105 | 84 |
| Flash, COC, °F | 580+ | 640+ |
| Viscosity, 140° F., poise | 1,150 | 1,460 |
| Rolling thin film oven test (RTFOT) California test procedure 346–C: | | |
| Retained penetration, percent original | | |
| Viscosity of residue, 140° F., poise | 3,350 | 2,500 |
| Viscosity ratio, residue/original | 2.9 | 1.7 |
| Durability test on residue from RTFOT California test procedure 347–A: | | |
| Viscosity of residue, 77° F., megapoise: | | |
| Shear rate, 0.001 sec.$^{-1}$ | 12.0 | 9.75 |
| Shear rate, 0.05 sec.$^{-1}$ | 7.5 | 3.8 |
| Viscosity ratio, durability/RTFOT: | | |
| Shear rate, 0.001 sec.$^{-1}$ | 4×10³ | 4×10³ |
| Shear rate, 0.05 sec.$^{-1}$ | 2×10³ | 2×10³ |
| Shear susceptibility slope, 77° F | 0.12 | 0.24 |

From the results shown in Table III it is evident that Asphalt 4 of the invention, containing the specified amount of mineral spirits, has a substantially improved post-aging viscosity and viscosity ratio. Here the viscosity ratios (viscosity of the residue from the durability test divided by the viscosity of the residue from the RTFOT) were desirably low in both cases showing the solvent in nowise degraded the durability following the first aging step. While the shear susceptibility slope of Conventional Asphalt C is considered acceptable, this product has an undesirably low viscosity after oven aging. Asphalt 4 of the invention has both a very acceptable shear susceptibility slope and a desirably high post-aging viscosity ratio.

The excellent compaction properties of asphalt-aggregate mixes prepared with the present compositions have been observed in actual service in the field. In one such test, 5,000 gallons of Asphalt 3 was mixed with aggregate at temperatures of 310° to 320° F. in a contractor's hot mix plant and the asphalt aggregate mix applied to the surface of a parking lot with highly satisfactory results.

We claim as our invention:

1. A paving asphalt composition having a flash point above 440° F. and a post-aging to pre-aging viscosity ratio of at least 2, consisting essentially of an asphalt cement having incorporated therein from 0.1 to 1.5 percent by weight of a hydrocarbon fraction boiling within the range of from about 100° F. to about 550° F.

2. The composition of claim 1 wherein the hydrocarbon fraction is kerosene.

3. The composition of claim 1 wherein the hydrocarbon fraction is mineral spirits.

4. The composition of claim 1 wherein the hydrocarbon fraction is naphtha.

5. The composition of claim 2 wherein the hydrocarbon fraction is incorporated into the asphalt cement in an amount of from 0.5 to 1.0 percent by weight.

6. The composition of claim 4 wherein the hydrocarbon fraction is incorporated into the asphalt cement by the addition of a rapid-curing cutback asphalt.

7. The composition of claim 2 wherein the hydrocarbon fraction is incorporated into the asphalt cement by the addition of a medium-curing cutback asphalt.

8. The composition of 4 wherein the hydrocarbon fraction is incorporated into the asphalt cement in an amount of from 0.3 to 0.8 percent by weight.

* * * * *